July 4, 1961   R. J. BRANDMAYR ET AL   2,990,602
METHOD OF HOT-PRESSING CERAMIC FERRO-ELECTRIC MATERIALS
Filed Jan. 5, 1959
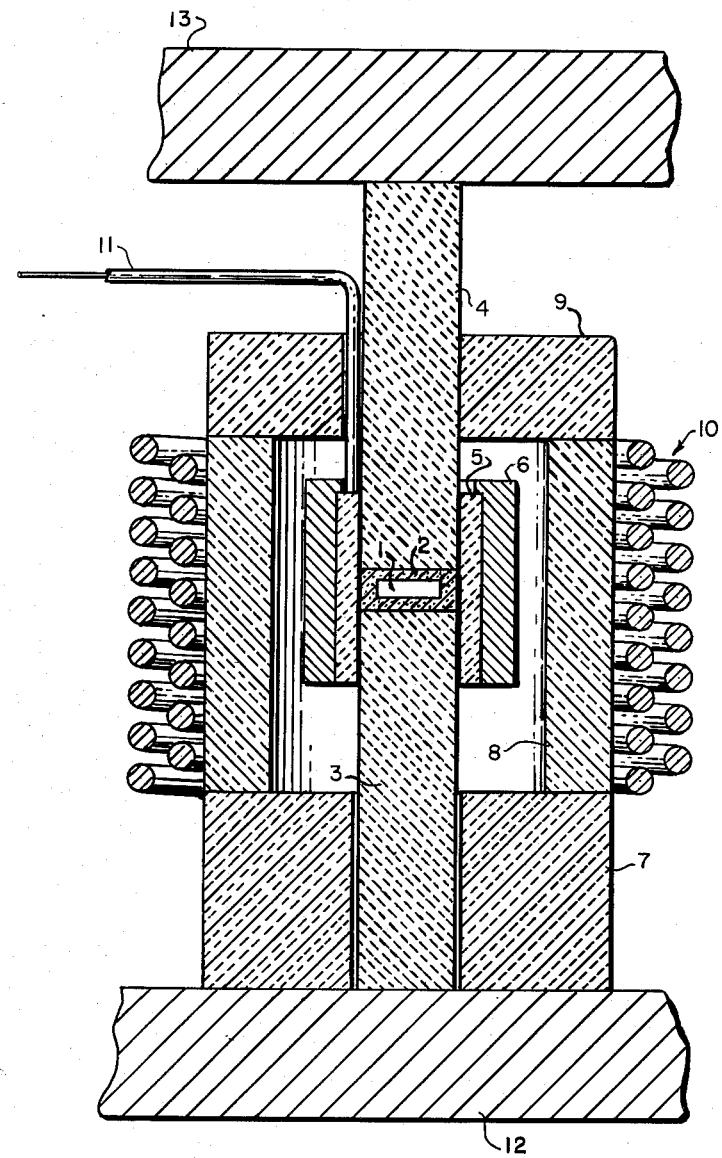
INVENTORS,
RONALD J. BRANDMAYR
ARTHUR E. BROWN
SAM Di VITA &
ROBERT J. FISCHER.
BY *Harry M. Saragovitz*
ATTORNEY.

2,990,602
METHOD OF HOT-PRESSING CERAMIC FERRO-ELECTRIC MATERIALS

Ronald J. Brandmayr, Eatontown, N.J., Arthur E. Brown, Florence, S.C., and Sam Di Vita and Robert J. Fischer, West Long Branch, N.J., assignors to the United States of America as represented by the Secretary of the Army
Filed Jan. 5, 1959, Ser. No. 785,096
1 Claim. (Cl. 25—157)
(Granted under Title 35, U.S. Code (1952), sec. 266)

The invention described herein may be manufactured and used by or for the Government for governmental purposes without the payment of any royalty thereon.

This invention relates to hot press molding of ceramic type ferro-electric materials such as barium titanate ($BaTiO_3$), cadmium niobate ($Cd_2Nb_2O_3$), lead titanate ($PbTiO_3$) and lead zirconate ($PbZrO_3$) or mixtures of these materials.

Barium titanate and other ceramic type ferro-electric materials owe their great importance to the fact that their dielectric constant is about one hundred times higher than that of conventional dielectric materials provided their compositional and structural purity are extremely high. The value of crystalline barium titanate bodies, for instance, as used in computer elements, magnetic amplifiers, memory devices, etc. depends on both the compositional and the structural purity of the barium titanate crystals. This purity will, in turn, depend on the purity of the raw materials used in manufacturing the barium titanate compound and on the particular methods of manufacture which determine the particle size, homogeneity, and the structural purity of the crystals.

It has been known to make barium titanate by dry mixing barium carbonate and titanium carbonate or by dry mixing barium oxalate and titanium oxalate and then heating the dry mixtures of these compounds to temperatures high enough to bring about a solid state reaction yielding barium titanate. To obtain the desired small particle size these solid state reaction products have to be ground. However, small portions of the barium and titanate compounds may not have reacted with each other and may therefore be present as such in the finished product. The barium titanate thus obtained will therefore be contaminated with barium compounds and titanium compounds. Besides, it is rather difficult to get a homogeneous particle size solely by mechanical grinding operations. Therefore, the barium titanate particles made according to this known method are far from having a high degree of compositional and structural purity and do not exhibit a homogeneous particle size.

It has been known to hot press ferro-electric materials, e.g., barium titanate in graphite dies, but this procedure results in reduced barium titanate ceramics which upon subsequent oxidation is subject to grain growth.

It has been proposed (U.S. patent application, Serial No. 654,432, filed April 22, 1957, now abandoned) to hot press ferro-electric materials in a die that consists of aluminum oxide or alumina ($Al_2O_3$) of highest density and highest available purity by dry pressing finely divided ferro-electric materials preferably in a steel mold under high pressures at room temperatures whereupon the resulting pellet is heated while in said alumina die to about 1000° C. and then pressed at high pressures (8000 to 12,000 p.s.i.) to produce an end product which shows a very high dielectric constant but the finished body is somewhat difficult to remove from the alumina die without breaking both the die and the finished pellet.

It now has been found that it is possible to hot press ferro-electric ceramic materials in such a manner as to produce non-reduced pellets of extremely fine and homogeneous grain size and excellent dielectric properties that can be easily removed from the die by hot pressing a prepressed pellet of ferro-electric ceramic material completely imbedded in a casing of pressed zirconia powder.

The invention will become more apparent from the following description of a specific embodiment in which a barium titanate disc is hot pressed in the apparatus shown in the accompanying drawing representing in cross-section a loaded die assembly between the hydraulic press heads of a laboratory press, with the barium titanate pellet imbedded in a casing of pressed zirconia powder.

The hot pressing apparatus shown in the drawing consists of an induction furnace used in conjunction with a laboratory hand press and a die assembly.

A prepressed pellet 1 of barium titanate is completely inclosed in a casing 2 of pressed zirconia powder. The incased pellet 1 is held between two cylindrical plungers 3 and 4 of ceramic material, fitting into a ceramic sleeve 5. A stainless steel bushing 6 is shrunk onto the ceramic sleeve 5 and serves as a susceptor adding support to the ceramic die sleeve 5 should any cracks develop due to thermal shock.

The die assembly 3, 4, 5 and 6 is arranged in an induction furnace consisting of split insulating fire bricks 7, 8 and 9 and heated by water cooled HF induction coils. The fire bricks are cut to fit inside the induction coils 10 and around the die assembly 3, 4, 5 and 6. A thermocouple 11 is provided to measure the temperature near the pellet 1. The die assembly rests on the lower hydraulic press head 12 of an appropriate press, e.g., a Carver laboratory press, the upper head 13 of which exerts pressure against the upper plunger 4 of the die assembly. The induction power supply for the induction furnace consists of a 20 kilowatt, 10 kilocycle motor generator unit (not shown in the drawing) which allows rapid heating with good control.

The hot pressing of ferro-electric materials according to subject invention in the hot pressing apparatus shown in the drawing is carried out with different ferro-electric materials as described below.

*Example I*

Barium titanate powder of very high purity and a particle size of about one-half of 1 micron is submitted to a dry pressing operation in a stainless steel die at room temperatures and at pressures of about 20,000 p.s.i. using no binder. To make a pellet of about .75″ in diameter and one-eighth of an inch in thickness, it is sufficient to keep the powder in the steel press for about 10 seconds.

Before putting this barium titanate pellet into the die, bottom plunger 3 is put into the sleeve 5 less than about half way and a layer of zirconia powder is placed on the flat surface of the bottom plunger 3. The zirconia powder is then pressed in the die with the help of the upper plunger 4 at a pressure of about 5000 p.s.i. Sufficient zirconia powder is used to yield a disc of about one-sixteenth of an inch thickness. The top plunger 4 is then removed leaving the disc of zirconia powder on the lower plunger 3. Now the previously pressed barium titanate pellet 1 is centered on this disc, care being taken that the pellet 1 is about one-eighth of an inch smaller in diameter than the inside diameter of the plungers 3 and 4. An additional amount of zirconia powder is then packed down around the edges of the barium titanate pellet 1 and on top of it and the upper plunger 4 is again inserted and a pressure of about 5000 p.s.i. again exerted so as to completely imbed or incase the barium titanate pellet in a shell of pressed zirconia powder. The loaded die is then aligned in the induction coil 10 and a pressure of 5000 p.s.i. is impressed on the plungers 3 and 4. The insulating bricks 7, 8 and 9 are then fitted into place around the die and a platinum-platinum-rhodium thermocouple 11 is placed on the zirconia sleeve against the upper plunger 4.

To maintain small grain size in the finished barium titanate pellet 1 it is necessary to bring the heat up very quickly to a temperature of about 2000° F. A period of eight to ten minutes is generally sufficiently short to prevent detrimental effects. The rate of heating may be controlled manually by controlling the input power of the coils 10. A pressure of 5000 p.s.i. is maintained on the pellet thruout the heating period. The hydraulic system of the Carver laboratory press has to be bled to maintain the pressure of 5000 p.s.i. and thus prevent a rise in pressure due to thermal expansion of the plungers 3 and 4.

At a temperature between 1700 and 1800° F. flow of the barium titanate pellet 1 is indicated by a drop in pressure. When this flow occurs the pressure is readjusted to 5000 p.s.i.

The pellet 1 is held at 2000° F. for about twenty minutes after which time the pressure is released and the power turned off. The hydraulic press head 12 is now lowered and a pipe (not shown in the drawing) is inserted over the top plunger 4 resting it on the stainless steel sleeve 6 and the pellet 1 is ejected by pressing the bottom plunger 3 up thru the zirconia sleeve 5. The pellet 1 which is still imbedded in the zirconia shell is immediately removed from the furnace and buried in vermiculite, a heat insulating powder that covers the sample and prevents thermal shock which may bring about cracking of the finished pellet 1. After cooling the pellet 1 is removed from its zirconia casing 2, ground to the desired shape and polished.

The polished pellet has a yellowish color which is characteristic of non-reduced barium titanate. Fracture surfaces of the pellet made according to the invention are glassy, an indication of high density. Density measurements made by displacement average 5.9 to as high as 6.0. When examined under 500× magnification the polished pellet exhibits no apparent grain structure before or after etching. Examination of a carefully polished pellet under the electron microscope at a magnification of 20,000× show grain sizes of about 0.5 micron and the particle size distribution is very homogeneous which indicates that there is no apparent grain growth of the barium titanate if hot pressed in the above described manner. In short, the hot press process of subject invention leads to high density barium titanate bodies with fine grain structure and no visible domain structure.

The electrical properties of hot pressed barium titanate pellets prepared according to the invention are quite striking when compared to conventionally known methods. The dielectric strength of barium titanate made according to the invention has been found to be 500 volt per mil as compared with values of 100 to 200 volt per mil usually observed in conventionally processed barium titanate. The dielectric constant at room temperature of the hot pressed pellet prepared according to the invention was above 3000 as compared to 1000–1500 with the conventionally fired samples.

The ceramic die material which has proved most effective for the hot pressing of barium titanate is slightly porous 100% stabilized zirconia. The die used in the above-described example consisted of such a zirconia supplied by the "Titanium Alloy Manufacturing Company." This zirconia is known under the trade name "TAM #1." Other materials such as alumina, alumina porcelains, stellite alloys and stainless steel can also be used since the casing of zirconia in which the barium titanate pellet is imbedded prevents deleterious effects of these materials on the barium titanate. It should be noted, however, that alumina and zirconia will show better thermal shock resistance if these dies are slightly porous. If a slightly porous 100% stabilized zirconia is used some degree of success is obtained in pressing barium titanate even if the imbedding in zirconia powder is omitted.

*Example 2*

A mixture containing 45% of lead titanate ($PbTiO_3$) and 55% of lead zirconate ($PbZrO_3$) was prepared from the constituent oxides and calcined at 1470° F. for one half hour. It was then finely ground until a homogeneous extremely fine particles size was achieved. This mixture was pressed in a steel mold at room temperature in the manner described in the previous example. The pre-pressed pellet was then hot pressed in essentially the same manner as described for barium titanate with the exception that the temperature in the hot press was being kept at about 1800° F.

*Example 3*

A dry pressed pellet of cadmium niobate ($Cd_2Nb_2O_7$) is prepared by dry pressing the finely ground niobate in a stainless steel die at room temperature using pressures of about 5000 p.s.i. The dry pressed pellet is then imbedded by the above-described method in a casing of zirconia and then heated to a temperature of between 800 to 1000° C. whereupon pressure is applied ranging between 8000 to about 12,000 p.s.i. for about ten minutes.

The zirconia powder used in the above-described examples for the purpose of imbedding the ferro-electric material during hot pressing should be a relatively coarse powder. Best results have been obtained from a zirconia powder supplied by the Titanium Alloy Manufacturing Company and designated as TAM #45006. This zirconia powder consists of about 6% having a particle size coarser than about 60 mesh, 20% between 60 to 120 mesh, 23% between 120 and 200 mesh and 51% somewhat coarser than 200 mesh.

If the pellet of ferro-electric material is incased in the relatively coarse zirconia powder the incased pellet can be easily ejected while it is hot. If the zirconia powder is too fine it would sinter to such an extent that the sample would crack when ejected from the die. Naturally some of the zirconia powder may adhere to the sample even if the zirconia powder has optimal coarseness but these few adhering spots can be easily ground off from the surface layer of the pellet. Also the pellet imbedded in the zirconia casing does not form a true disc and grinding to the desired shape is necessary if a regular cylindrical disc is desired.

It should be noted that some measure of success is achieved if a slightly porous 100% stabilized zirconia die is used without imbedding the ferro-electric pellets into the zirconia powder. This is particularly true if the die is made from a zirconia supplied by the Titanium Alloy Manufacturing Company and designated as TAM #1.

All ferro-electric materials hot pressed according to subject invention show an extremely high dielectric constant, a homogeneous, dense, fine-grain structure and may be manufactured with relatively very slight losses due to breaking.

Having described specific embodiments of the invention, what is claimed is:

A method of making shaped ceramic ferro-electric articles of extremely high dielectric constants from powdered ferro-electric barium titanate comprising the steps of dry pressing powdered ferro-electric barium titanate at room temperatures in a steel mold at a pressure of about 20,000 p.s.i. to form a pellet; completely incasing said pellet in a shell of pressed zirconia powder by first embedding said pellet in said zirconia powder and then subjecting the completely embedded pellet at room temperatures to pressures of about 5,000 p.s.i., said zirconia powder having a particle size consisting of 6% coarser than about 60 mesh, 20% between 60 to 120 mesh, 23% between 120 and 200 mesh and 51% between 200 to 220 mesh; hot pressing the incased pellet in a ceramic die, the material for the ceramic die being selected from the group consisting of alumina, stellite alloys, stainless steel and stabilized zirconia, said hot pressing being performed at pressures between about 5,000 to 12,000 p.s.i. and at temperatures between about 800 to 2000° F. for a period of about 8 to 10 minutes; removing the imbedded, hot pressed article from the furnace, slowly cooling it to room temperature, and removing the zirconia casing from the shaped ferro-electric article.

References Cited in the file of this patent

UNITED STATES PATENTS

| | | |
|---|---|---|
| 2,091,569 | Ridgway et al. | Aug. 31, 1937 |
| 2,335,325 | Wainer | Nov. 30, 1943 |
| 2,563,307 | Burnham et al. | Aug. 7, 1951 |
| 2,741,561 | Das Gupta | Apr. 10, 1956 |
| 2,956,327 | Borel et al. | Oct. 18, 1960 |

FOREIGN PATENTS

| | | |
|---|---|---|
| 1,120,211 | France | Apr. 16, 1956 |